(12) United States Patent
Tang et al.

(10) Patent No.: US 11,306,845 B2
(45) Date of Patent: Apr. 19, 2022

(54) SNAP-ON FAUCET HANDLE

(71) Applicant: Delta Faucet Company, Indianapolis, IN (US)

(72) Inventors: Yilin Tang, Nangang Harbin (CN); Adam M. DeVries, Anderson, IN (US); Kurt Judson Thomas, Indianapolis, IN (US)

(73) Assignee: Delta Faucet Company, Indianapolis, IN (US)

( * ) Notice: Subject to any disclaimer, the term of this patent is extended or adjusted under 35 U.S.C. 154(b) by 0 days.

(21) Appl. No.: 17/078,637

(22) Filed: Oct. 23, 2020

(65) Prior Publication Data

US 2021/0254749 A1  Aug. 19, 2021

Related U.S. Application Data

(63) Continuation-in-part of application No. 16/791,455, filed on Feb. 14, 2020.

(51) Int. Cl.
*F16K 31/60* (2006.01)

(52) U.S. Cl.
CPC ................... *F16K 31/605* (2013.01)

(58) Field of Classification Search
CPC .................. F16K 31/60–605; Y10T 137/9464
See application file for complete search history.

(56) References Cited

U.S. PATENT DOCUMENTS

| 5,025,826 | A | 6/1991 | Schoepe et al. |
| 5,257,645 | A | 11/1993 | Scully et al. |
| 5,947,149 | A | 9/1999 | Mark |
| 6,438,771 | B1 | 8/2002 | Donath, Jr. et al. |
| 8,074,893 | B2 * | 12/2011 | Mace ................. G05D 23/1353 236/12.11 |
| 8,079,381 | B2 | 12/2011 | Fischer et al. |
| 9,062,796 | B2 | 6/2015 | Horsman et al. |
| 10,184,571 | B2 | 1/2019 | Chen et al. |
| 10,774,946 | B2 * | 9/2020 | Mooren .................. B25G 3/18 |

(Continued)

FOREIGN PATENT DOCUMENTS

| AU | 2005229735 | 5/2007 |
| CN | 103836253 | 6/2014 |

(Continued)

OTHER PUBLICATIONS

U.S. Appl. No. 16/791,455, titled "Snap-On Faucet Handle," filed Feb. 14, 2020. 18 pages.

*Primary Examiner* — Marina A Tietjen
(74) *Attorney, Agent, or Firm* — Bose McKinney & Evans LLP

(57) ABSTRACT

A handle assembly for a faucet includes a receiver defined by a handle body and having a vertically tapered side wall defining a receiving chamber, a slot extending through the tapered side wall into the receiving chamber, and a wire form retainer coupled around the receiver and being at least partially disposed within the slot for extending into the receiving chamber. A tapered valve stem includes a retaining recess, and wherein the tapered valve stem is received within the receiving chamber of the receiver so that at least a portion of the wire form retainer extends through the slot of the receiver and is received within the retaining recess of the tapered valve stem.

17 Claims, 12 Drawing Sheets

(56) References Cited

U.S. PATENT DOCUMENTS

| | | | |
|---|---|---|---|
| 11,035,485 B2 * | 6/2021 | Lin | E03C 1/0404 |
| 2006/0174946 A1 * | 8/2006 | Kajuch | F16K 31/605 |
| | | | 137/360 |
| 2009/0120519 A1 | 5/2009 | Chen | |
| 2010/0071778 A1 * | 3/2010 | Nelson | E03C 1/084 |
| | | | 137/15.01 |
| 2010/0200081 A1 | 8/2010 | Fischer et al. | |
| 2011/0073205 A1 * | 3/2011 | Marty | E03C 1/0404 |
| | | | 137/801 |
| 2012/0273075 A1 | 11/2012 | Pitsch et al. | |
| 2015/0152975 A1 | 6/2015 | Jonte | |
| 2017/0211721 A1 * | 7/2017 | Ritter | F16K 3/08 |
| 2019/0178403 A1 | 6/2019 | Crowe et al. | |
| 2019/0271140 A1 | 9/2019 | Davidson et al. | |

FOREIGN PATENT DOCUMENTS

| | | | | |
|---|---|---|---|---|
| CN | 209398908 | 9/2019 | | |
| DE | 102005029050 | 1/2007 | | |
| DE | 102015219524 A1 * | 4/2017 | | F16K 11/0743 |
| GB | 687692 A * | 2/1953 | | F16K 31/60 |
| JP | 2889009 | 10/1992 | | |
| JP | 2004251050 | 9/2004 | | |

\* cited by examiner

SNAP-ON FAUCET HANDLE

CROSS-REFERENCE TO RELATED APPLICATION

The present application is a continuation-in-part of prior U.S. application Ser. No. 16/791,455, filed Feb. 14, 2020, the disclosure of which is hereby incorporated by reference for all purposes.

BACKGROUND AND SUMMARY OF THE DISCLOSURE

The present disclosure relates generally to a faucet and, more particularly, to a device for coupling a handle to a stem of a faucet valve cartridge.

The present disclosure allows a handle to be coupled to and uncoupled from a faucet valve cartridge by snapping it on and off a valve stem. Typical faucet handles use threaded fasteners (e.g., set screws) to couple to a valve stem. The handle assembly of the present disclosure allows for less assembly time, and a reduction of scrap due to fastener cross-threading often resulting from the use of conventional threaded fasteners. It also allows for a lower profile handle by providing for a potential attachment point below the top of an associated bonnet cap.

According to an illustrative embodiment of the present disclosure, a handle assembly for a faucet includes a handle having a handle body, and a receiver defined by the handle body. The receiver includes at least one vertically tapered side wall defining a receiving chamber. A slot extends through the tapered side wall into the receiving chamber. A wire form retainer is coupled around the receiver and is at least partially disposed within the slot for extending into the receiving chamber. A tapered valve stem includes a retaining recess. The tapered valve stem is received within the receiving chamber of the receiver so that at least a portion of the wire form retainer extends through the slot of the receiver and is received within the retaining recess of the tapered valve stem.

According to another illustrative embodiment of the present disclosure, a faucet includes a handle having a handle body, and a receiver having a receiving chamber defined by the handle body and a slot extending through the handle body into the receiving chamber. A wire form retainer is coupled around the receiver and is at least partially disposed within the slot for extending into the receiving chamber. A valve cartridge is supported by a valve body and includes a valve stem having a retaining recess. A bonnet nut is threadably coupled to the valve body, and a bonnet cap cooperates with the bonnet nut. The valve stem is received within the receiving chamber of the receiver so that the wire form retainer is received within the retaining recess of the valve stem.

According to another illustrative embodiment of the present disclosure, a handle assembly for a faucet includes a handle, and the handle includes a handle body and a receiver defined by the handle body. The receiver includes at least one vertically tapered side wall that defines a receiving chamber, a slot that extends through the tapered side wall into the receiving chamber, and a wire form retainer that is carried by the receiver and is at least partially disposed within the slot for extending into the receiving chamber. The handle assembly further includes a tapered valve stem that has a retaining recess. The tapered valve stem is received within the receiving chamber of the receiver so that at least a portion of the wire form retainer is received within the retaining recess of the tapered valve stem.

According to yet another illustrative embodiment of the present disclosure, a handle assembly for a faucet includes a handle, and the handle includes a handle body and a receiver defined by the handle body and including a receiving chamber. A wire form retainer is carried by the receiver, and the wire form retainer has a U-shape including a first arm, a second arm, and a connecting portion coupling the first arm and the second arm. The handle assembly further includes a valve stem having a first retaining recess and a second retaining recess. The valve stem is received within the receiving chamber of the receiver so that the first arm of the wire form retainer is received within the first retaining recess of the valve stem and the second arm of the wire form retainer is received within the second retaining recess of the valve stem.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention. Although the disclosure is described in connection with water, it should be understood that additional fluids may be used.

Figure 1:
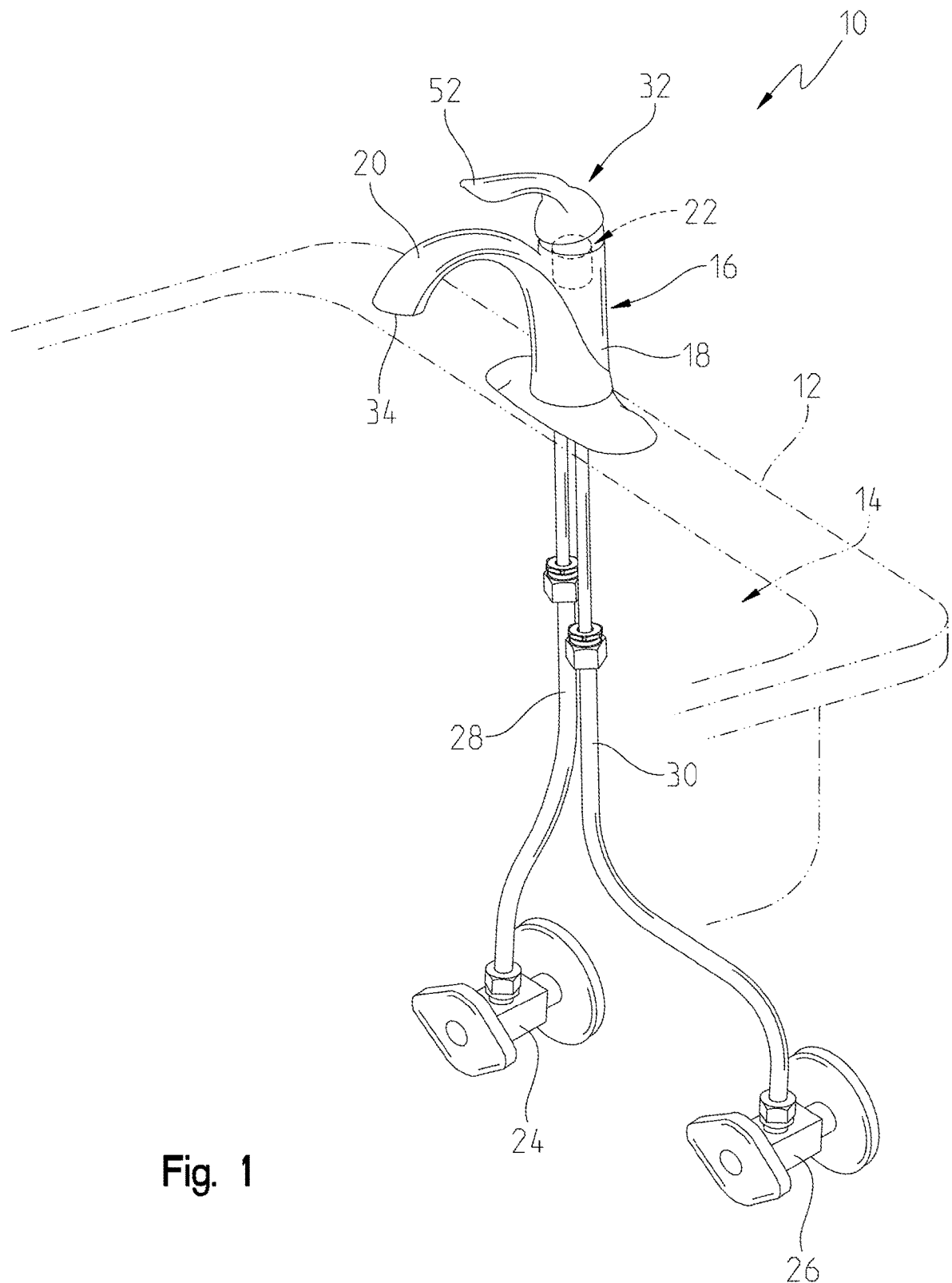
FIG. 1 is a perspective view of an illustrative faucet of the present disclosure, shown supported by a sink deck.

Referring initially to FIG. 1, an illustrative faucet 10 is shown coupled to a mounting deck 12, such as a sink deck for dispensing water into a sink basin 14. The faucet 10 illustratively includes a faucet body 16 including a hub or valve body 18 and a delivery spout 20. Illustratively, a valve cartridge 22 is supported within the valve body 18 and is fluidly coupled to hot and cold water supplies 24 and 26 (e.g., conventional water stops) via hot and cold water supply lines 28 and 30 (e.g., flexible tubes).

Figure 2:
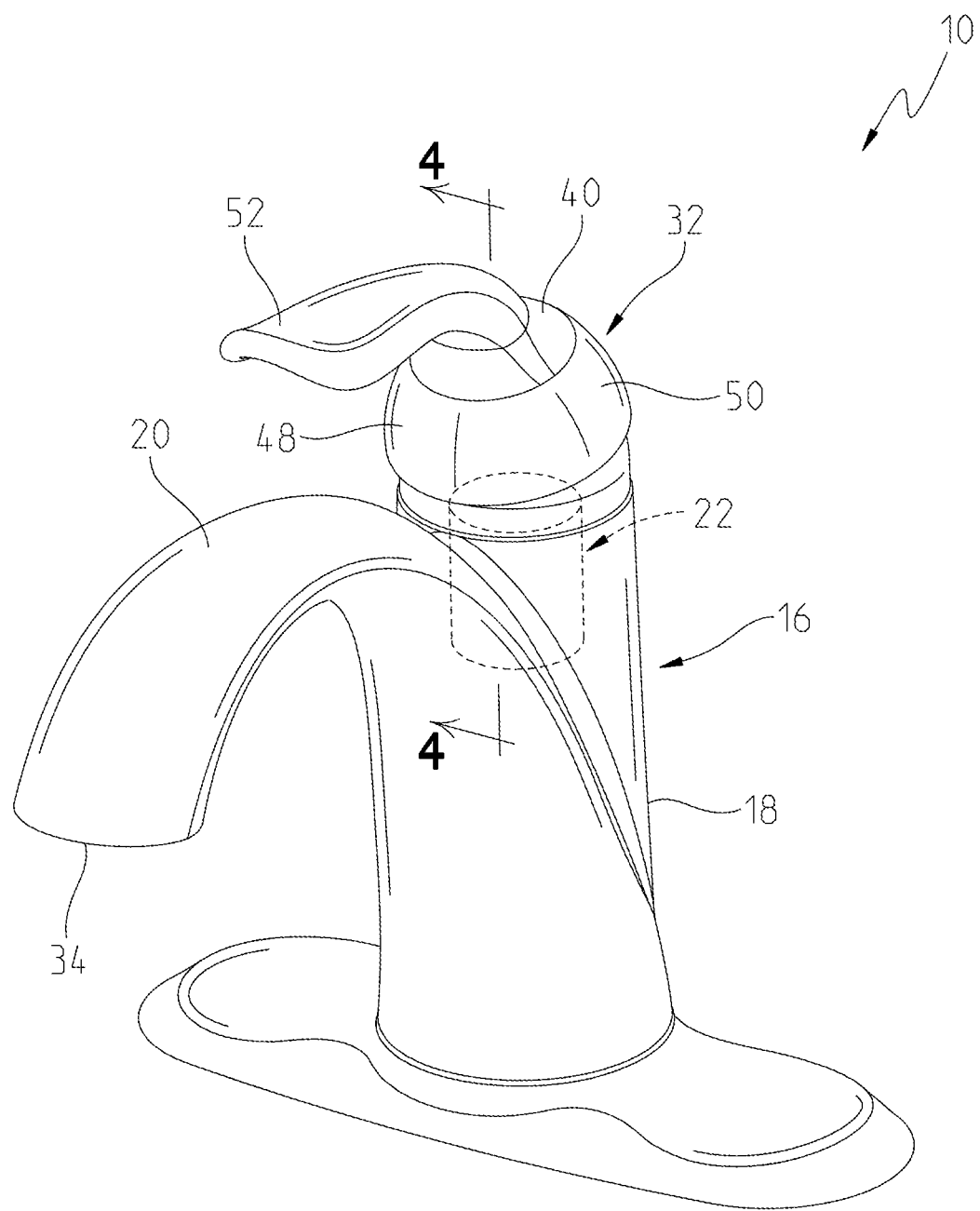
FIG. 2 is a perspective view of the illustrative faucet of FIG. 1.
Figure 3:
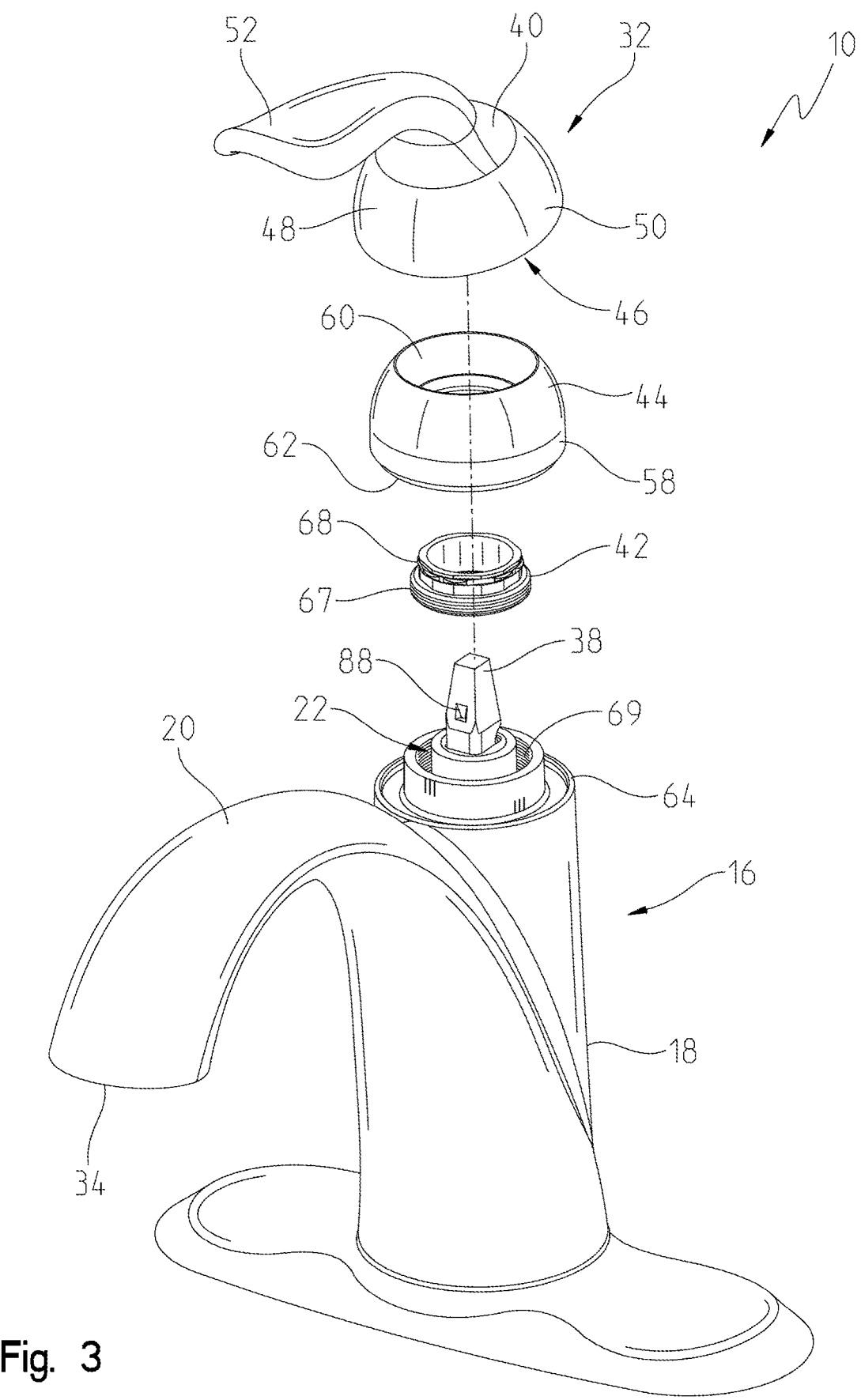
FIG. 3 is a partial exploded perspective view of the illustrative faucet handle assembly of FIG. 1.

Referring to FIGS. 2 and 3, the faucet 10 illustratively includes a handle assembly 32 operably coupled to the valve cartridge 22. Operation of handle assembly 32 controls the valve cartridge 22 and, hence, water flow from the conduits 28 and 30 to the water outlet 34. More particularly, the valve cartridge 22 may be of conventional design for controlling the flow rate and the temperature (i.e., mixture of water from the hot and cold water conduits 28 and 30) of water dispensed from the water outlet 34. The illustrative valve cartridge 22 includes a valve stem 38 configured to move a valve member (e.g., a valve plate or disc) (not shown) for controlling water flow rate and water temperature in a known manner.

Figure 6:
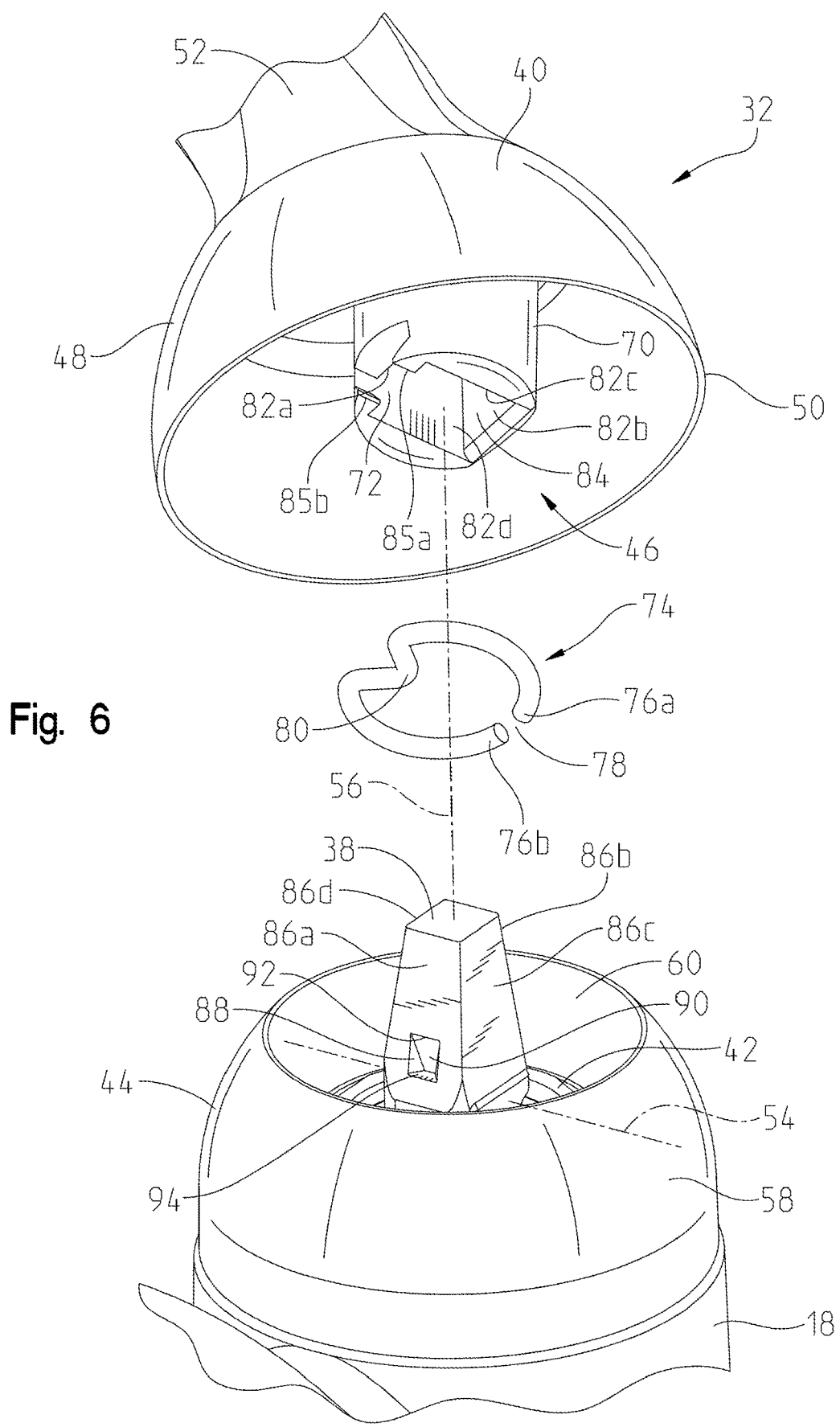
FIG. 6 is a partial exploded perspective view of the illustrative faucet handle assembly of FIG. 1.

The handle assembly 32 illustratively includes a handle 40 operably coupled to the valve stem 38 of the valve cartridge 22, a coupler 42 (e.g., a bonnet nut) securing the valve cartridge 22 to the valve body 18, and a bonnet cap 44 operably coupled to the bonnet nut 42 and received within a lower opening 46 of the handle 40. According to the illustrative embodiment of FIG. 2, the illustrative handle 40 includes a handle body 48 having a base 50 and a user interface 52. While the user interface 52 illustratively comprises a lever, the user interface 52 may comprise other components such as knobs. The handle 40 is operably moveable in both vertical and horizontal directions. More particularly, the handle 40 is configured to pivot about orthogonal axes to control water flow rate and temperature. More particularly, the handle 40 controls flow rate when rotated about a horizontal axis 54 and controls water temperature when rotated about a vertical axis 56 (FIG. 6). Alternatively, handle 40 could be operably moveable in other directions relative to the faucet body 48 to control water flow rate and/or temperature.

In the illustrative embodiment of FIG. 2, the lever 52 and the base 50 of the handle 40 are rigidly coupled and immovable relative to each other. For example, the handle body 48 may be machined from a metal or molded from a polymer and subsequently plated. Alternatively, the lever 52 and the base 50 may be movable relative to each other.

The bonnet cap 44 is coupled to the faucet body 16, and is received within the lower opening 46 of the handle 40. More particularly, the bonnet cap 44 illustratively includes a semi-spherical outer wall 58 and a frusto-conical inner wall 66 concentrically positioned within the outer wall 58. More particularly, a lower end of the outer wall 58 includes an annular lip 62 received within an annular protrusion or ring 64 of the faucet body 16. An inwardly facing surface 66 of the inner wall 60 engages with a retainer 68 supported by the bonnet nut 42. The retainer 68 illustratively comprises an annular clip formed of a resilient material, such as a polymer.

As noted above, the valve body 18 is coupled to the bonnet cap 44 via coupler or bonnet nut 42. The coupler 42 could be attached to the valve body 18 and the bonnet cap 44 via welds, adhesive, threads, or any other form of coupling. However, in the present embodiment, the bonnet nut 42 includes external threads 67 engaging with internal threads 69 of the valve body 18, and frictionally engages the bonnet cap 44.

The handle 40 and the bonnet cap 44 may be constructed from any number of materials including but not limited to metals and plastics. Additionally, different parts of the faucet 10 could be made from differing material, or the whole faucet 10 may be made from the same material.

Figure 4:
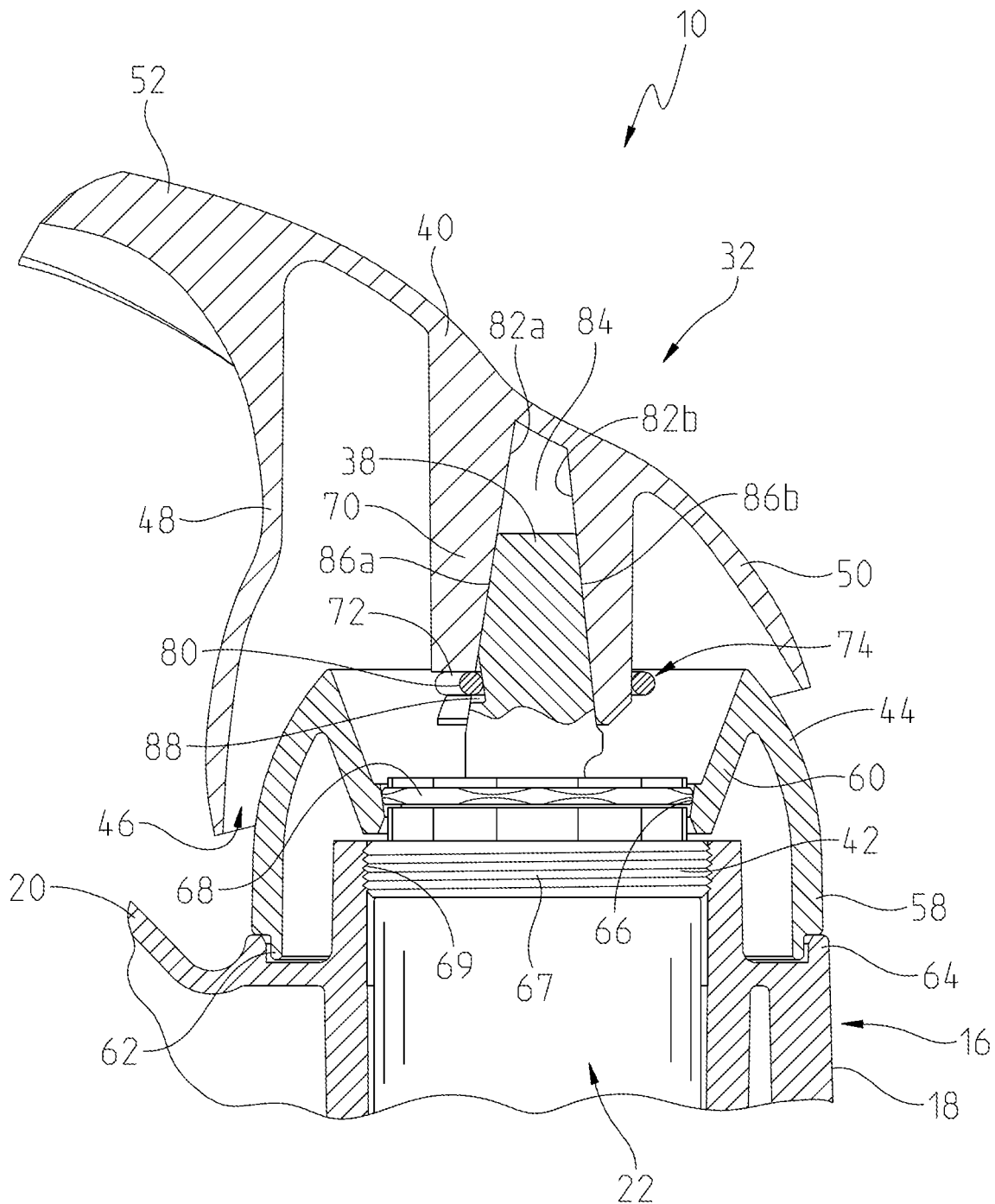
FIG. 4 is a partial cross-sectional view taken along line 4-4 of FIG. 1.

FIG. 4 is a partial horizontal cross-section of the handle assembly 32 and the valve body 18 receiving the valve cartridge 22. As illustrated, the handle assembly 32 includes the valve cartridge 22, the handle 40, the valve body 18, the coupler 42, and the bonnet cap 44. The handle body 48 further includes a receiver 70 positioned inwardly from the base 50. A slot 72 extends within the receiver 70 and receives a portion of a wire form retainer 74. The wire form retainer 74 may be comprised of metal or plastic and may be circular, or another shape with resilient properties.

In the illustrative embodiment, the wire form retainer 74 includes opposing arms 76a and 76b having first or open ends separated by an opening or gap 78. Second or closed ends of the opposing arms 76a and 76b are coupled together by an inwardly extending connecting portion 80.

With reference to FIGS. 4-6, the receiver 70 of the handle body 48 includes at least one vertically tapered side wall 82 defining a receiving chamber 84. In the illustrative embodiment, four vertically tapered side walls 82a, 82b, 82c, 82d define the receiving chamber 84 having a rectangular transverse cross-section. The slot 72 extends through the tapered side wall 82a into the receiving chamber 84. The wire form retainer 74 is coupled around the receiver 70 and is at least partially disposed within the slot 72 and extends into the receiving chamber 84. A lower end of the slot 72 is illustratively defined by opposing protrusions or lips 85a and 85b.

The valve body 18 receives and supports the valve cartridge 22. Illustratively, the valve stem 38 of the valve cartridge 22 is tapered. More particularly, the valve stem 38 includes inclined or tapered surfaces 86a, 86b, 86c, 86d cooperating with the side walls 82a, 82b, 82c, 82d of the receiver 70. The valve stem 38 illustratively includes a retaining recess or groove 88 formed within the tapered surface 86a. The retaining groove 88 may take on different shapes in different embodiments. However, in the illustrative embodiment, the retaining groove 88 has a recessed surface 90 extending between an upper edge 92 and a lower edge 94. The surface 90 of the retaining groove 88 is illustratively tapered inwardly from the upper edge 92 to the lower edge 94. Alternatively, the upper edge 92 could be flat or take on a more curvilinear shape and may be angled opposite the taper of the tapered valve stem 38.

To couple the valve cartridge 22 to the handle 40, the tapered valve stem 38 is received within the receiving chamber 84 of the receiver 70 so that at least a portion of the wire form retainer 74 extends through the slot 72 of the receiver 70 and is received within the retaining groove 88 of the tapered valve stem 38. Additionally, to help limit unwanted movement, the surfaces 86 of the tapered valve stem 38 and the tapered side wall 82 of the receiver 70 have matching taper angles. When assembled, the bonnet cap 44 extends partially into the handle body 48, and the retaining groove 88 is below an upper edge of the bonnet cap 44.

In other words, the handle 40 captures the valve stem 38 between the tapered receiving chamber in the handle 40 and a wire form retainer 74 that is supported by the receiver 70. The location of the wire form retainer 74 can be below the top of the bonnet cap 44 because it does not need to be accessed during removal or assembly.

Figure 5A:
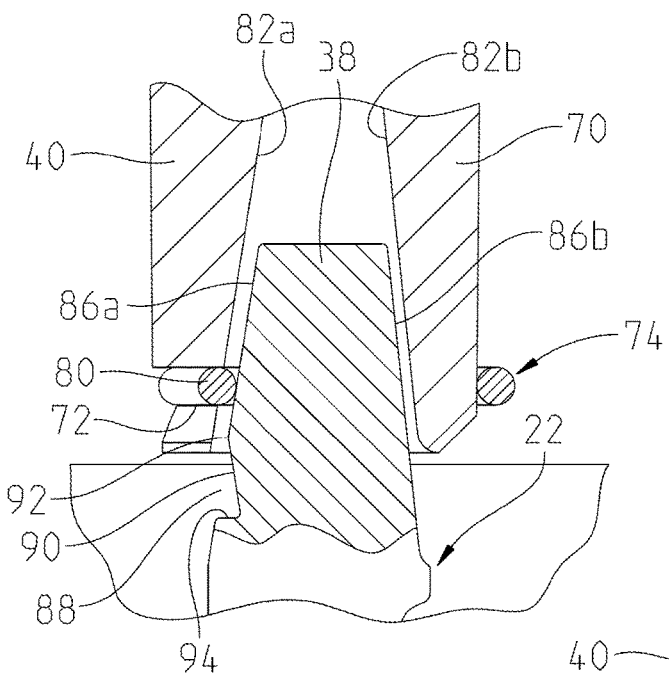
FIG. 5A is a partial cross-sectional view similar to FIG. 4, showing the faucet handle assembly in a first assembly step.
Figure 5B:
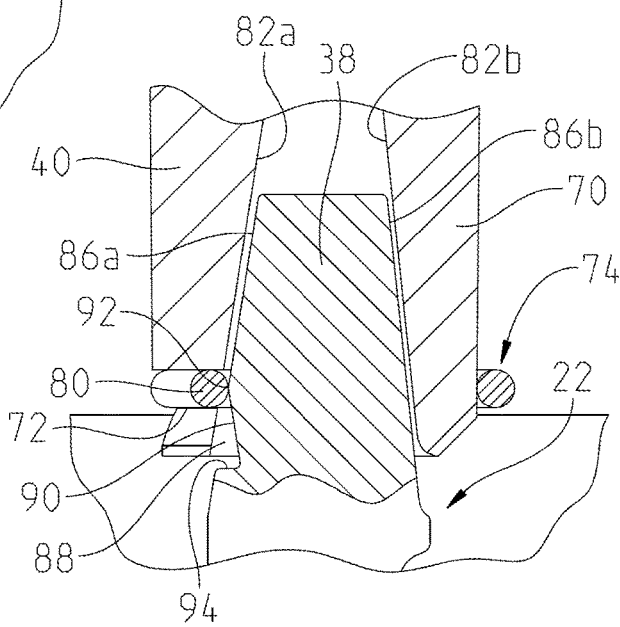
FIG. 5B is a partial cross-sectional view similar to FIG. 4, showing the faucet handle assembly in a second assembly step.
Figure 5C:
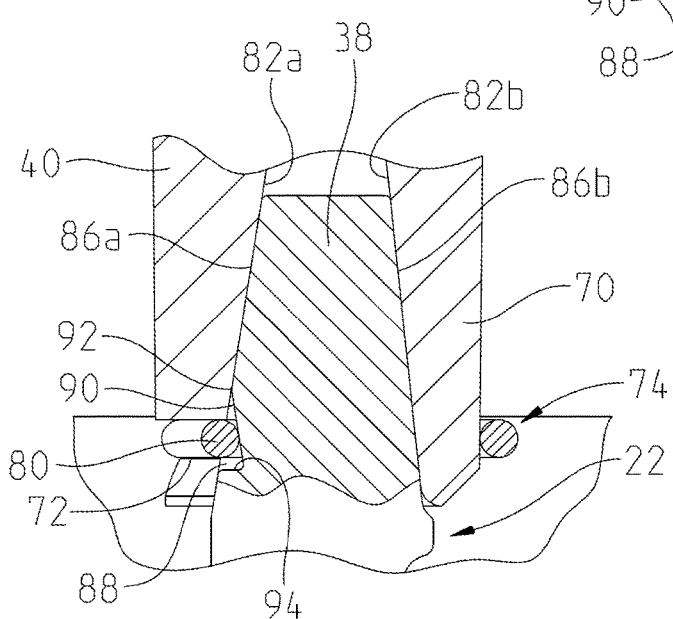
FIG. 5C is a partial cross-sectional view similar to FIG. 4, showing the faucet handle assembly in a third assembly step.

Referring to FIGS. 5A-5C, the wire form retainer 74 is integral for assembly and removal of the handle assembly 32. The wire form retainer 74 extends around the receiver 70 and at one side of the receiver 74 is in the slot 72. The wire form retainer 74 is shaped so that the connecting portion 80 of the wire form retainer 74 extends through the slot 72 and at least partially into the receiving chamber 84. FIG. 5A shows an early or first step of assembly. The user positions the handle assembly 32 such that the receiving chamber 84 is aligned with the tapered valve stem 38 and begins to push down on the handle 40. As depicted in FIG. 5A, as the receiving chamber 84 moves down the tapered valve stem 38, the wire form retainer 74 catches the tapered side surface 82a of the tapered valve stem 38 and provides resistance and engages as the receiving chamber 84 moves down the tapered valve stem 38. This action provides a biasing force that pushes the receiver 70 up and away from the tapered valve stem 38.

FIG. 5B shows a middle or second step of the assembly process. The wire form retainer 74 is at its most flexed position immediately before it reaches the retaining groove 88 of the tapered valve stem 38. At this point, the wire form retainer 74 is not providing any axial retaining force. However, because the connecting portion 80 of the wire form retainer 74 is at the peak where the tapered sides 82 of the tapered valve stem 38 meet the tapered upper edge 92 of the retaining groove 88, any force that the user might put on the receiver 70, up or down, would result in resilient movement of the wire form retainer 74, thus biasing the receiver 70 into a locked and assembled position, or towards separation from the tapered valve stem 38.

FIG. 5C shows a final or third step of the assembly process, the receiver 70 and the tapered valve stem 38 in an assembled and locked position. Due to the shape and taper of the retaining groove 88, the wire form retainer 74 is in a resting position and axially retains the receiver 70. More particularly, the tapered shape of the retaining groove 88 holds the wire form retainer 74 in place. Furthermore, the retaining groove 88 could have a number of different shapes including a flat taper, as depicted in FIGS. 5A-5C, or it could have a curvilinear taper and shape.

In order to reverse the assembly process, and disassemble the handle assembly 32, force is applied in an upward direction to move the handle assembly 32 from the position of FIG. 5C back to the position of FIG. 5B, and then further force is needed to move the handle assembly 32 from the position of FIG. 5B to the position of FIG. 5A and completely apart. The shape and angle of the taper of the retaining groove 88 and, more particularly, the upper edge 92, changes the amount of force needed to take apart the handle assembly 32. Similarly, the angle of the tapered surface 86a of the tapered valve stem 38 would change the amount of force needed to assemble the handle assembly 32.

In other words, the wire form retainer 74 is snapped into slot 72 of the receiver 70. The receiving chamber 84 is then placed over the valve stem 38. Tapered or inclined surface 86a of the valve stem 38 pushes the wire form retainer 74 partially out of the slot 72 to allow the handle 40 to be inserted. The wire form retainer 74 snaps into the retaining groove 88 of the valve stem 38 to hold it in place. The handle 40 can be removed by pulling with a greater force than what is required to install the handle 40 and with minimal tools or skills required.

FIG. 6 is an exploded view of the handle assembly 32 of the exemplary embodiment. FIG. 6 shows one illustrative shape of the wire form retainer 74. As depicted, the wire form retainer 74 has open portion or gap which allows the resilient nature of whichever material is used for the wire form retainer 74 to create a biasing force in either an assembly direction or a disassembly direction. Additionally, the wire form retainer 74 has at least one portion that matches the overall shape and size of the receiver 70. This provides some friction which allows the wire form retainer 74 to hold its position relative to the receiver 70 and hold it in place. Finally, the wire form retainer 74 has curved or bent connecting portion 80 that matches the size of the slot 72 and allows the wire form retainer 74 to extend through the slot 72, provide resistance during assembly, and lock the receiver 70 and the tapered valve stem 38 in place while assembled. FIG. 6 also depicts one embodiment of the retaining groove 88 and one embodiment of the slot 72 in greater detail.

Figure 7:
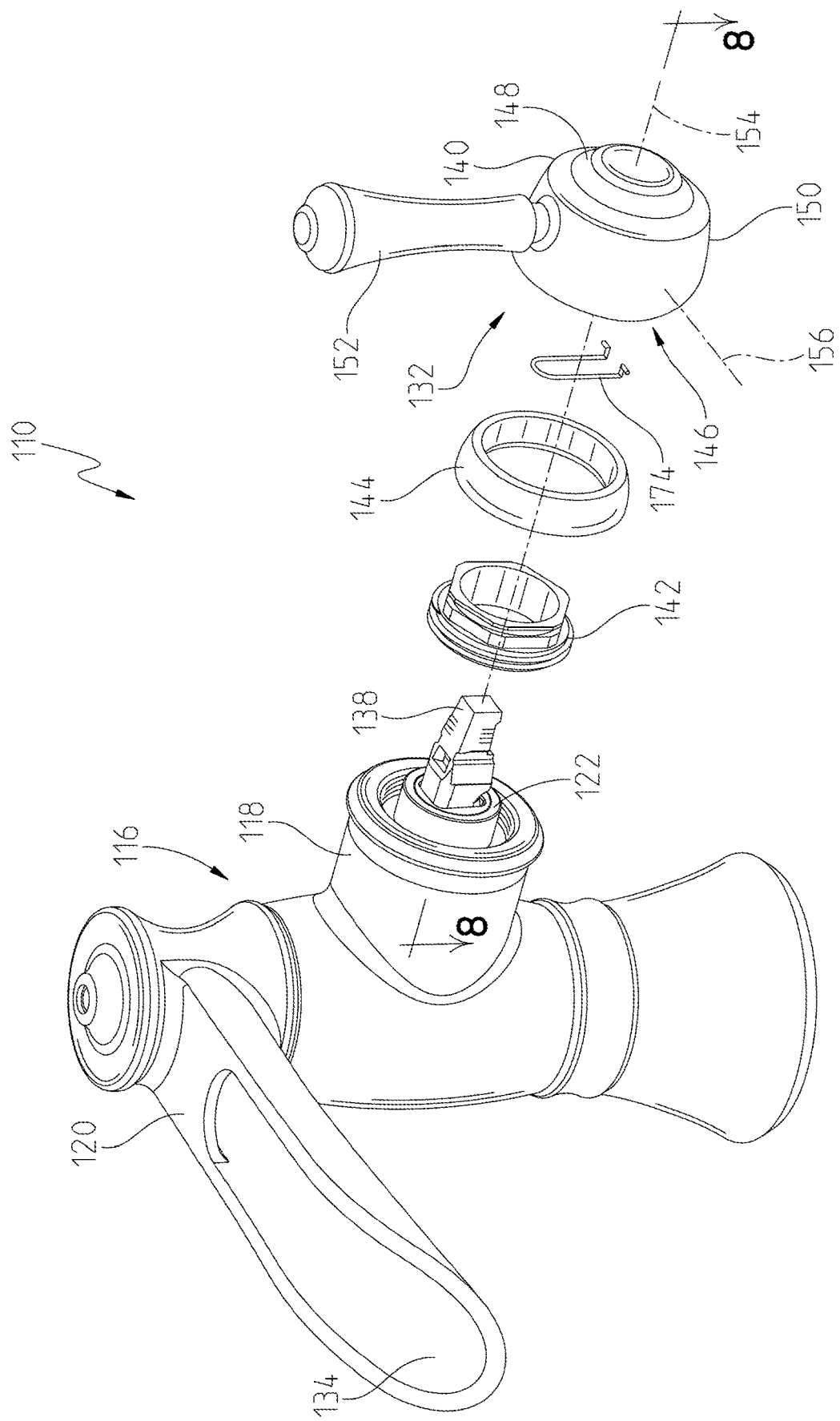
FIG. 7 is a partial exploded perspective view of another illustrative faucet handle assembly of the present disclosure.

Referring now to FIG. 7, an exploded view of another illustrative faucet 110 is provided. The faucet 110 may be coupled to a sink deck and hot and cold water supplies via hot and cold water supply lines, respectively, in a similar manner to the faucet 10. The faucet 110 illustratively includes a faucet body 116 including a hub or valve body 118 and a delivery spout 120. Illustratively, a valve cartridge 122 is supported within the valve body 118 and is fluidly coupled to the hot and cold water supply lines.

With continued reference to FIG. 7, the faucet 110 illustratively includes a handle assembly 132 operably coupled to the valve cartridge 122. Operation of handle assembly 132 controls the valve cartridge 122 and, hence, water flow from the supply lines to the water outlet 134. More particularly, the valve cartridge 122 may be of conventional design for controlling the flow rate and the temperature (i.e., mixture of water from the hot and cold water supply lines) of water dispensed from the water outlet 134. The illustrative valve cartridge 122 includes a valve stem 138 configured to move a valve member (e.g., a valve plate or disc) (not shown) for controlling water flow rate and water temperature in a known manner.

The handle assembly 132 illustratively includes a handle 140 operably coupled to the valve stem 138 of the valve cartridge 122, a coupler 142 (e.g., a bonnet nut) securing the valve cartridge 122 to the valve body 118, and a bonnet cap 144 operably coupled to the bonnet nut 142 and received within a side opening 146 of the handle 140. According to the illustrative embodiment of FIG. 7, the illustrative handle 140 includes a handle body 148 having a base 150 and a user interface 152. While the user interface 152 illustratively comprises a lever, the user interface 152 may comprise other components such as knobs. The handle 140 is operably moveable in both vertical and horizontal directions. More particularly, the handle 140 is configured to pivot about orthogonal axes to control water flow rate and temperature. More particularly, the handle 140 controls flow rate when rotated about a first horizontal axis 154 and controls water temperature when rotated about a second horizontal axis 156. Alternatively, handle 140 could be operably moveable in other directions relative to the faucet body 148 to control water flow rate and/or temperature.

In the illustrative embodiment of FIG. 7, the lever 152 and the base 150 of the handle 140 are rigidly coupled and immovable relative to each other. For example, the handle body 148 may be machined from a metal or molded from a polymer and subsequently plated. Alternatively, the lever 152 and the base 150 may be movable relative to each other.

Figure 8:
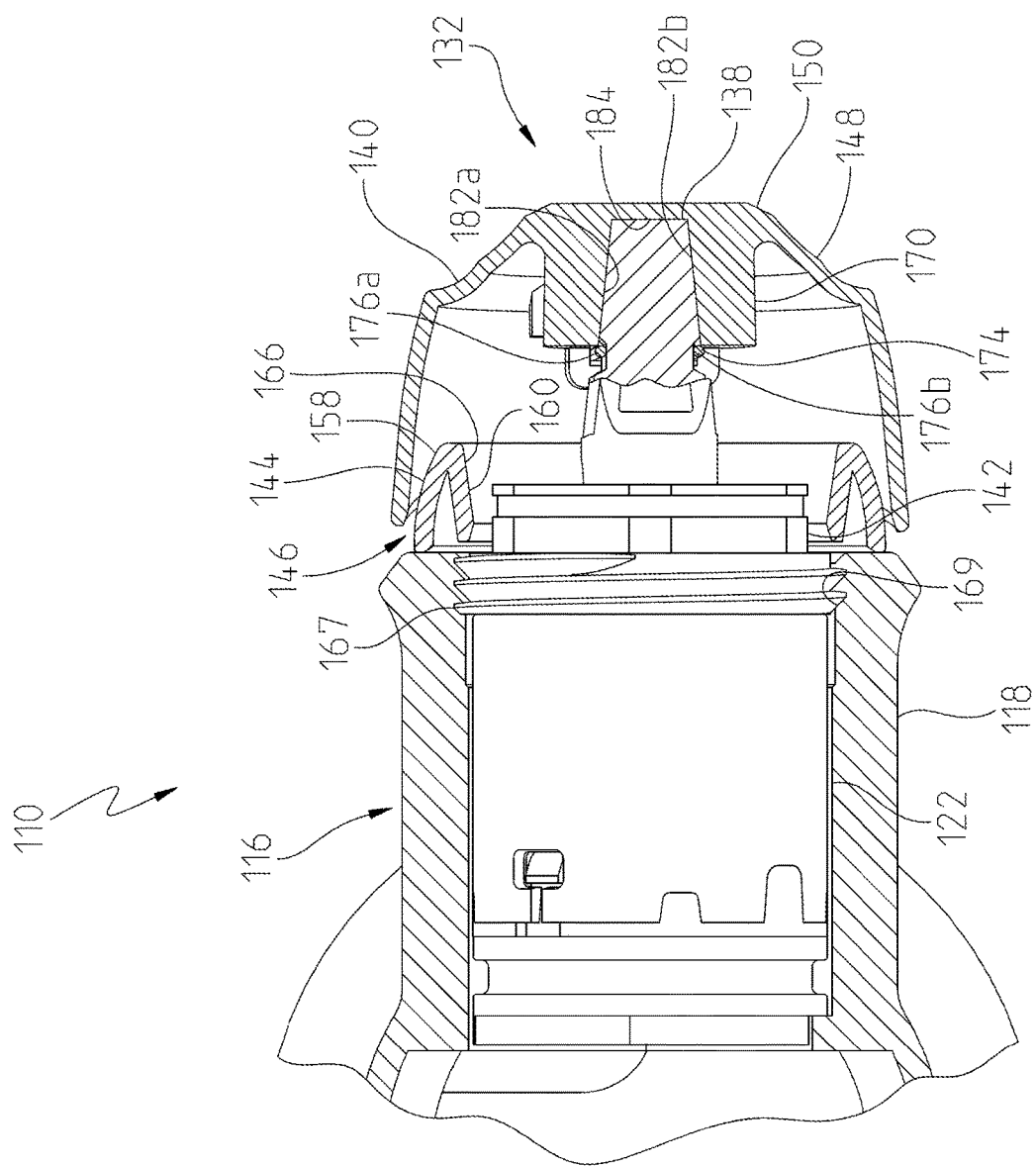
FIG. 8 is a partial cross-sectional view of the faucet taken along line 8-8 of FIG. 7.

With continued reference to FIG. 7 and additional reference to FIG. 8, the bonnet cap 144 is coupled to the faucet body 116, and is received within the lower opening 146 of the handle 140. More particularly, the bonnet cap 144 illustratively includes a semi-spherical outer wall 158 and a frusto-conical inner wall 160 concentrically positioned within the outer wall 158. An inwardly facing surface 166 of the inner wall 160 engages with a retainer (not shown—similar to the retainer 68 of the faucet 10) supported by the bonnet nut 142. The retainer illustratively comprises an annular clip formed of a resilient material, such as a polymer.

As noted above, the valve body 118 is coupled to the bonnet cap 144 via coupler or bonnet nut 142. The coupler 142 could be attached to the valve body 118 and the bonnet cap 144 via welds, adhesive, threads, or any other form of coupling. However, in the present embodiment, the bonnet nut 142 includes external threads 167 engaging with internal threads 169 of the valve body 118, and frictionally engages the bonnet cap 144.

The handle 140 and the bonnet cap 144 may be constructed from any number of materials including but not limited to metals and plastics. Additionally, different parts of the faucet 110 could be made from differing material, or the whole faucet 110 may be made from the same material.

With specific reference to FIG. 8, a partial horizontal cross-section view of the handle assembly 132 and the valve body 118 receiving the valve cartridge 122 is provided. As illustrated, the handle assembly 132 includes the valve cartridge 122, the handle 140, the valve body 118, the coupler 142, and the bonnet cap 144. The handle body 148 further includes a receiver 170 positioned inwardly from the base 150. The receiver 170 illustratively carries a wire form retainer 174 for coupling the handle 140 to the valve stem 138.

Figure 9:
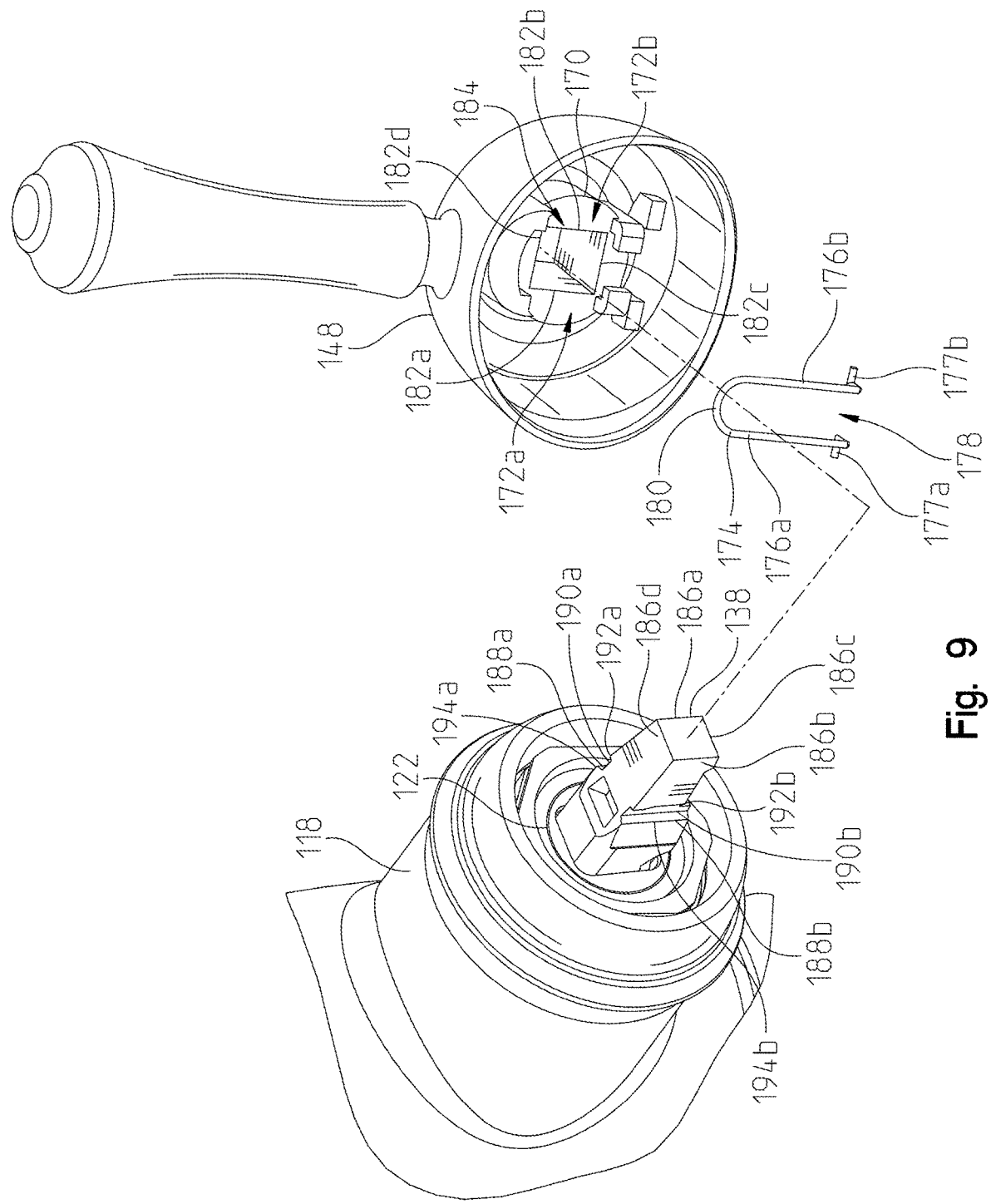
FIG. 9 is a partial exploded perspective view of the illustrative faucet handle assembly of FIG. 7.

With continued reference to FIG. 8 and additional reference to FIG. 9, the wire form retainer 174 may be comprised of metal or plastic and may have a general U-shape, or more specifically and as illustrated an upside-down U-shape, or another shape with resilient properties. In the illustrative embodiment, the wire form retainer 174 includes opposing arms 176a and 176b having first or open ends separated by an opening or gap 178 (see FIG. 9). The first ends of the arms 176a and 176b may also include outwardly extending protrusions or hands 177a and 177b that facilitate coupling the wire form retainer 174 to the receiver 170. Second or closed ends of the opposing arms 176a and 176b are illustratively coupled together by a curved connecting portion 180.

Figure 11:
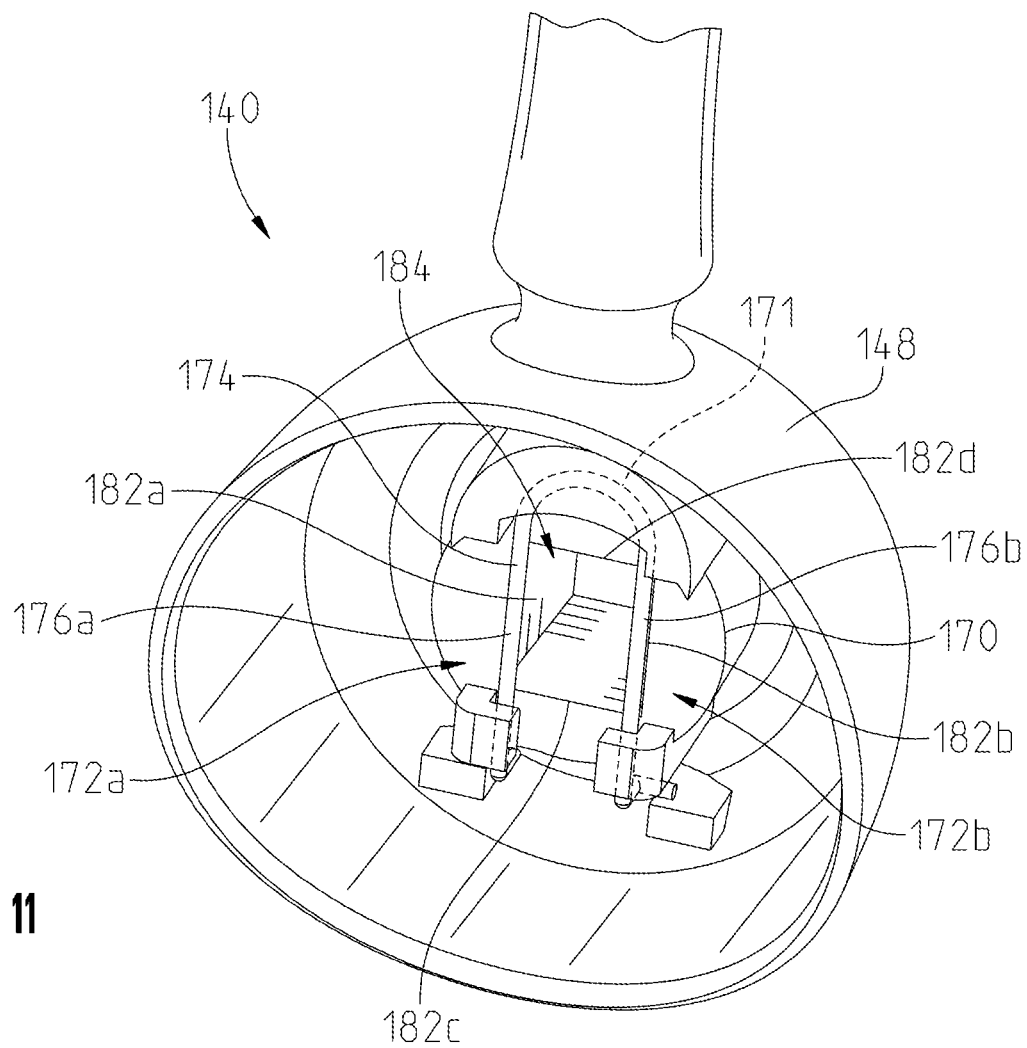
FIG. 11 is a partial perspective view of a handle of the faucet of FIG. 7.

With reference to FIGS. 8, 9, and 11, the receiver 170 of the handle body 148 illustratively includes at least one vertically tapered side wall defining a receiving chamber 184. In the illustrative embodiment, four vertically tapered side walls 182a, 182b, 182c, 182d define the receiving chamber 184 having a rectangular transverse cross-section. In the illustrative embodiment, the side walls 182a, 182b, 182c, 182d taper inwardly toward each other as they extend in a direction toward the base 150 of the handle body 148 (to the right in FIG. 8). The receiver 170 includes recesses, illustratively slots 172a and 172b that extend through the tapered side walls 182a and 182b, respectively, and into the receiving chamber 184. The wire form retainer 174 is coupled around a hub 171 of the receiver 170 (see FIG. 11), and the arms 176a and 176b of the wire form retainer 174 are at least partially disposed within the slots 172a and 172b, respectively, and extend into the receiving chamber 184.

Figure 10:
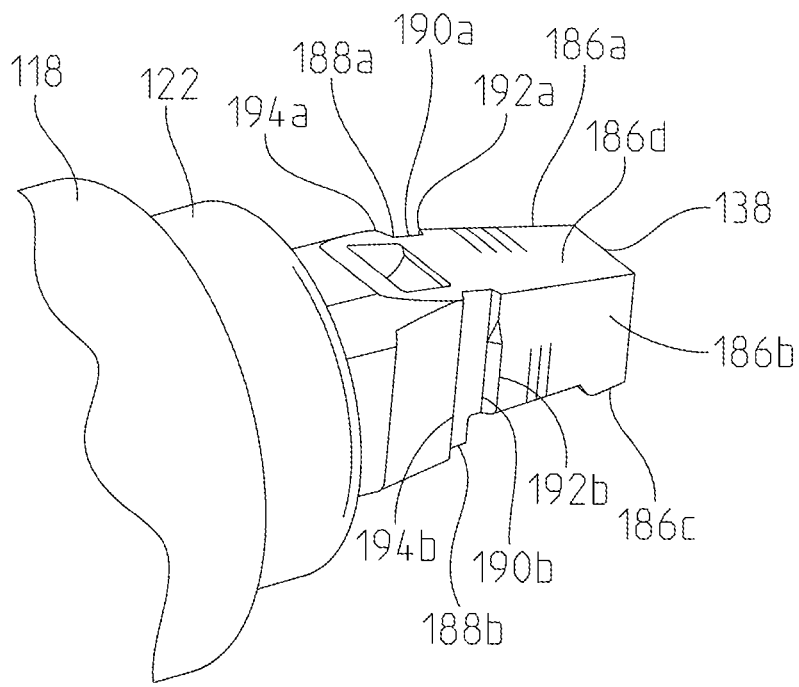
FIG. 10 is a partial perspective view of a valve stem of the faucet of FIG. 7.

With reference to FIGS. 9 and 10, the valve body 118 receives and supports the valve cartridge 122. Illustratively, the valve stem 138 of the valve cartridge 122 is tapered. More particularly, the valve stem 138 includes inclined or tapered surfaces 186a, 186b, 186c, 186d cooperating with the side walls 182a, 182b, 182c, 182d of the receiver 170. The valve stem 138 illustratively includes retaining recesses or grooves 188a and 188b formed within opposing tapered surfaces 186a and 186b, respectively. The retaining grooves 188a and 188b may take on different shapes in different embodiments. However, in the illustrative embodiment, the retaining grooves 188a and 188b have recessed surfaces 190a and 190b, respectively, extending between upper edges 192a and 192b, respectively, and lower edges 194a and 194b, respectively. Illustratively, the upper edges 192a and 192b and the lower edges 194a and 194b extend between the tapered surface 186c and the opposite tapered surface 186d.

To couple the valve cartridge 122 to the handle 140, the tapered valve stem 138 is received within the receiving chamber 184 of the receiver 170 and the wire form retainer 174 is received within the retaining grooves 188a and 188b of the tapered valve stem 138. More specifically, the arms 176a and 176b of the wire form retainer 174 are received with the within the retaining grooves 188a and 188b, respectively, of the tapered valve stem 138. Additionally, to help limit unwanted movement, the tapered surfaces 186a, 186b, 186c, and 186d of the tapered valve stem 138 and the tapered side walls 182a, 182b, 182c, and 186d of the receiver 170 illustratively have matching taper angles.

Figure 12A:
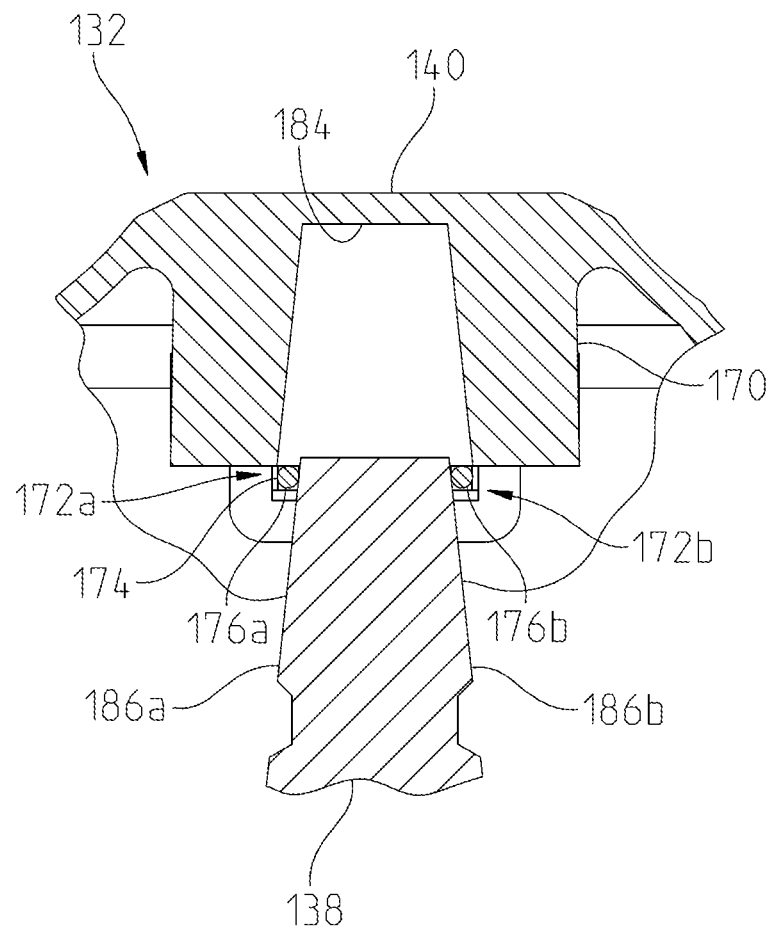
FIG. 12A is a detailed cross-sectional view similar to FIG. 8, showing the faucet handle assembly in a first assembly step.
Figure 12B:
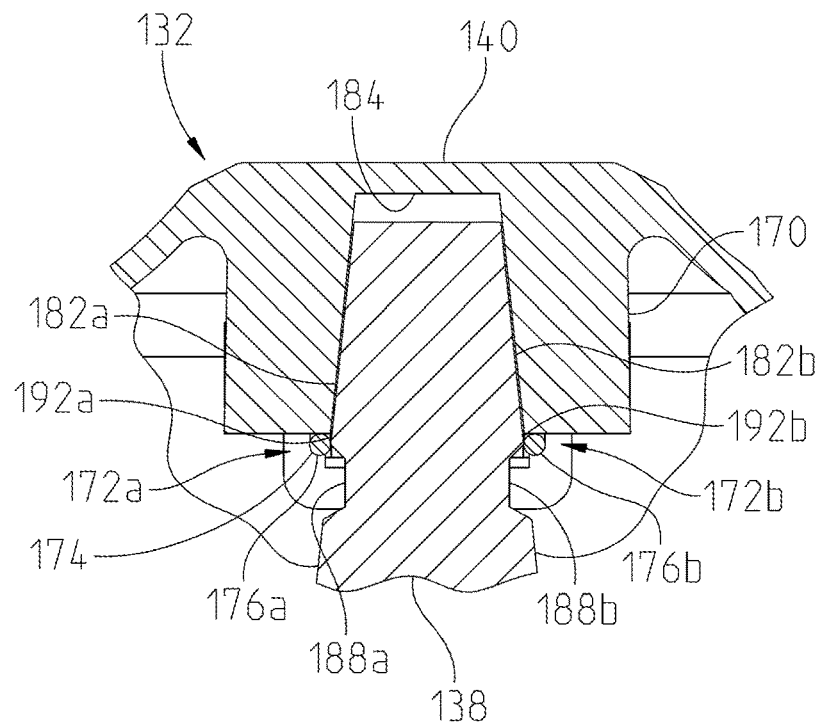
FIG. 12B is a detailed cross-sectional view similar to FIG. 8, showing the faucet handle assembly in a second assembly step.
Figure 12C:
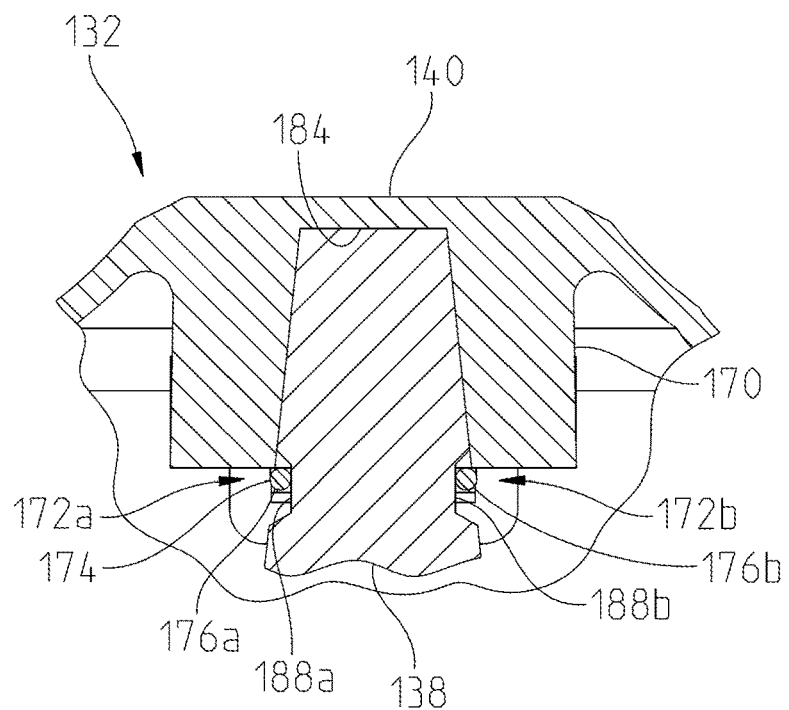
FIG. 12C is a detailed cross-sectional view similar to FIG. 8, showing the faucet handle assembly in a third assembly step.

Referring to FIGS. 12A-12C, the wire form retainer 174 is integral for assembly and removal of the handle assembly 132. The wire form retainer 174 extends around the hub 171 (shown elsewhere) of the receiver 170 and on two sides of the receiver 170 is disposed in the slots 172a and 172b. The wire form retainer 174 is shaped so that the arms 176a and 176b extend through the slots 172a and 172b, respectively, and at least partially into the receiving chamber 184. FIG. 12A shows an early or first step of assembly. The user positions the handle assembly 132 such that the receiving chamber 184 is aligned with the tapered valve stem 138 and begins to push the handle 140 toward the tapered valve stem 138. As depicted in FIG. 12A, as the receiving chamber 184 moves down the tapered valve stem 138, the arms 176a and 176b of the wire form retainer 174 catch the tapered side surfaces 186a and 186b, respectively, of the tapered valve stem 138 and provide resistance and engage as the receiving chamber 184 moves along the tapered valve stem 138. This action pushes the arms 176a, 176b outwardly into the slots 172a, 172b, respectively and provides a biasing force that pushes the receiver 170 away from the tapered valve stem 138.

FIG. 12B shows a middle or second step of the assembly process. The wire form retainer 174 is at its most flexed position immediately before it reaches the retaining grooves 188a and 188b of the tapered valve stem 138. At this point, the wire form retainer 174 is not providing any axial retaining force. However, because the arms 176a and 176b of the wire form retainer 174 are at the peaks where the tapered sides 182a and 182b of the tapered valve stem 138 meet the tapered upper edges 192a and 192b of the retaining groove 188a and 188b, respectively, any force that the user might apply to the receiver 170, toward or away from the valve stem 138, would result in resilient movement of the wire form retainer 174, thus pushing the receiver 170 into a locked and assembled position, or towards separation from the tapered valve stem 138.

FIG. 12C shows a final or third step of the assembly process, in which the receiver 170 and the tapered valve stem 138 are in an assembled and locked position. Due to the shape of the retaining grooves 188a and 188b, the wire form retainer 174 is in a resting position and axially retains the receiver 170. More particularly, the relatively narrow width of the tapered valve stem 138 at the retaining grooves 188a and 188b, in contrast to the relatively large width of the tapered valve stem 138 at the peaks of the tapered sides 182a and 182b, holds the wire form retainer 174 in place.

In order to reverse the assembly process, and disassemble the handle assembly 132, force is applied to move the handle assembly 132 from the position of FIG. 12C back to the position of FIG. 12B, and then further force is needed to move the handle assembly 132 from the position of FIG. 12B to the position of FIG. 12A and completely apart. The shape and angle of the retaining grooves 188a and 188b and, more particularly, the upper edges 192a and 192b, changes the amount of force needed to take apart the handle assembly 132. Similarly, the angle of the tapered surfaces 186a and 186b of the tapered valve stem 138 would change the amount of force needed to assemble the handle assembly 132.

In other words, the wire form retainer 174 is snapped into the slots 172a and 172b of the receiver 170. The receiving chamber 184 is then placed over the valve stem 138. Tapered surfaces 186a and 186b of the valve stem 138 pushes the wire form retainer 174 partially out of the slots 172a and 172b to allow the handle 140 to be inserted. The wire form retainer 174 snaps into the retaining grooves 188a and 188b of the valve stem 138 to hold it in place. The handle 140 can be removed by pulling with a greater force than what is required to install the handle 140 and with minimal tools or skills required.

The handle assembly 132 may be modified in various other manners. For example, in some alternative embodiments, the tapered valve stem 138 may be provided as a multiple-component structure. More specifically, the valve cartridge 122 may include a conventional round stem having, for example, an external spline surface, and the stem may carry a tapered adapter having, for example, the tapered surfaces and features described above. As another example, the hub 171 can be coupled to the remainder of the receiver 170 via a fastener (not shown). As another example, the handle assembly 132 may be used for one or both handles of a two-handle faucet assembly.

Although the invention has been described in detail with reference to certain preferred embodiments, variations and modifications exist within the spirit and scope of the invention as described and defined in the following claims.

What is claimed is:

1. A handle assembly for a faucet, the handle assembly comprising:
   a handle including:
      a handle body,
      a receiver defined by the handle body and including at least one vertically tapered side wall defining a receiving chamber,
      a slot extending through the tapered side wall into the receiving chamber, and
      a wire form retainer carried by the receiver and being at least partially disposed within the slot for extending into the receiving chamber; and
   a tapered valve stem having a retaining recess; and
   wherein the tapered valve stem is received within the receiving chamber of the receiver so that at least a portion of the wire form retainer is received within the retaining recess of the tapered valve stem.

2. The handle assembly of claim 1, wherein the wire form retainer is a resilient retainer.

3. The handle assembly of claim 1, wherein the tapered valve stem is supported by a valve cartridge, a valve body receives the valve cartridge, and a coupler secures the valve cartridge within the valve body.

4. The handle assembly of claim 3, wherein the coupler is a bonnet nut and the valve body is defined by a faucet body, the bonnet nut threadably coupled to the valve body.

5. The handle assembly of claim 1, wherein the tapered valve stem and the tapered side wall of the receiver have matching taper angles.

6. The handle assembly of claim 1, wherein the tapered side wall is a first tapered side wall and the slot is a first slot, and the receiver further comprises a second tapered side wall and a second slot extending through the second tapered side wall into the receiving chamber, wherein the wire form retainer is at least partially disposed within the second slot for extending into the receiving chamber, wherein the retaining recess is a first retaining recess and the tapered valve stem further comprise a second retaining recess, and wherein the tapered valve stem is received within the receiving chamber of the receiver so that the wire form retainer is received within the first retaining recess and the second retaining recess of the tapered valve stem.

7. The handle assembly of claim 6, wherein the wire form retainer comprises;
   a first arm;
   a second arm;
   a connecting portion coupling the first arm and the second arm;
   wherein the tapered valve stem is received within the receiving chamber of the receiver so that the firm arm is received within the first retaining recess of the tapered valve stem and the second arm is received within the second retaining recess of the tapered valve stem.

8. The handle assembly of claim 7, wherein the first arm, the second arm, and the connecting portion provide the wire form retainer with a U-shape.

9. The handle assembly of claim 7, wherein the receiver comprises a hub, and the connecting portion extends around the hub.

10. The handle assembly of claim 6, wherein the first retaining recess and the second retaining recess are disposed on opposite sides of the valve stem.

11. A handle assembly for a faucet, the handle assembly comprising:
   a handle including:
      a handle body;
      a receiver defined by the handle body and including a receiving chamber;
      a wire form retainer carried by the receiver, the wire form retainer having a U-shape comprising:
         a first arm including an open end and a closed end;
         a second arm including an open end and a closed end;
         a connecting portion coupling the closed end of the first arm and the closed end of the second arm;
         wherein the open end of the first arm and the open end of the second arm are coupled to the receiver, on a first side of the receiver;

wherein the connecting portion is coupled to the receiver, on a second side of the receiver spaced apart from the first side of the receiver by the receiving chamber;

a valve stem having a first retaining recess and a second retaining recess; and wherein the valve stem is received within the receiving chamber of the receiver so that the first arm of the wire form retainer is received within the first retaining recess of the valve stem and the second arm of the wire form retainer is received within the second retaining recess of the valve stem.

12. The handle assembly of claim 11, wherein the wire form retainer is a resilient retainer.

13. The handle assembly of claim 11, wherein the receiver comprises a hub, and the connecting portion extends around the hub.

14. The handle assembly of claim 11, wherein the first retaining recess and the second retaining recess are disposed on opposite sides of the valve stem.

15. The handle assembly of claim 11, wherein the receiver includes a first side wall, a second side wall spaced apart from the first side wall by the receiving chamber, a first slot extending through the first side wall into the receiving chamber, and a second slot extending through the second side wall into the receiving chamber.

16. The handle assembly of claim 15, wherein a portion of the wire form retainer between the open end of the first arm and the closed end of the first arm is disposed within the first slot and extends into the receiving chamber, and a portion of the wire form retainer between the open end of the second arm and the closed end of the second arm is disposed within the second slot and extends into the receiving chamber.

17. The handle assembly of claim 11, wherein the wire form retainer includes a first protrusion extending from the open end of the first arm, and a second protrusion extending from the open end of the second arm, wherein the first protrusion and second protrusion are coupled to the receiver.

* * * * *